United States Patent
Xu et al.

(10) Patent No.: US 11,077,351 B2
(45) Date of Patent: Aug. 3, 2021

(54) MEASUREMENT AND RECONSTRUCTION OF THE GOLF LAUNCHING SCENE IN 3D

(71) Applicant: RAPSODO PTE. LTD., Singapore (SG)

(72) Inventors: Jin Xu, Singapore (SG); Batuhan Okur, Singapore (SG); Lodiya Radhakrishnan Vijayanand, Singapore (SG)

(73) Assignee: RAPSODO PTE. LTD., Singapore (SG)

( * ) Notice: Subject to any disclaimer, the term of this patent is extended or adjusted under 35 U.S.C. 154(b) by 0 days.

(21) Appl. No.: 16/424,408

(22) Filed: May 28, 2019

(65) Prior Publication Data

US 2020/0282283 A1    Sep. 10, 2020

Related U.S. Application Data

(63) Continuation of application No. 16/210,891, filed on Dec. 5, 2018, now abandoned, which is a continuation of application No. 15/968,935, filed on May 2, 2018.

(51) Int. Cl.
```
A63B 69/36      (2006.01)
A63B 71/06      (2006.01)
A63B 24/00      (2006.01)
G06T 15/00      (2011.01)
A63B 102/32     (2015.01)
```
(52) U.S. Cl.
CPC ...... *A63B 69/3658* (2013.01); *A63B 24/0006* (2013.01); *A63B 69/3632* (2013.01); *A63B 71/0622* (2013.01); *A63B 2024/0031* (2013.01); *A63B 2071/0636* (2013.01); *A63B 2102/32* (2015.10); *A63B 2220/05* (2013.01); *A63B 2220/806* (2013.01); *A63B 2220/89* (2013.01); *G06T 15/00* (2013.01)

(58) Field of Classification Search
None
See application file for complete search history.

(56) References Cited

U.S. PATENT DOCUMENTS

| | | | |
|---|---|---|---|
| 9,925,433 B2 * | 3/2018 | Boggs | A63B 53/0487 |
| 2002/0173364 A1 * | 11/2002 | Boscha | A63B 69/3632 473/131 |
| 2006/0189399 A1 * | 8/2006 | Zanzucchi | A63B 69/3676 473/151 |

(Continued)

*Primary Examiner* — Ronald Laneau
(74) *Attorney, Agent, or Firm* — Maschoff Brennan

(57) ABSTRACT

A golf launching monitoring arrangement allows equipment to be placed at a position behind the player (i.e., behind the golf ball), to measure both club and ball movement. A 3D scan of the club head before the play serves two purposes: 1) 3D registration that enables accurate measurement of the club head position and orientation for the camera system measuring the club movement from the back; 2) for reconstruction of the launching scene. With a 3D model of the club head, a simple 3D model of the golf ball and accurate measurement of their movement during the play, a full 3D golf launching scene can be reconstructed authentically. With this reconstruction, the movement of both the club head and the resulting ball movement can be replayed at any viewing angle, with any frame rate and at whatever resolution for the players or the coaches to view and analyze.

30 Claims, 12 Drawing Sheets

(56) References Cited

U.S. PATENT DOCUMENTS

| | | | | |
|---|---|---|---|---|
| 2008/0289208 A1* | 11/2008 | Bryan | ............... | F26B 5/08 |
| | | | | 34/59 |
| 2010/0210377 A1* | 8/2010 | Lock | ............ | A63B 24/0006 |
| | | | | 473/409 |
| 2013/0072316 A1* | 3/2013 | Morin | ............... | A63B 69/36 |
| | | | | 473/223 |

* cited by examiner

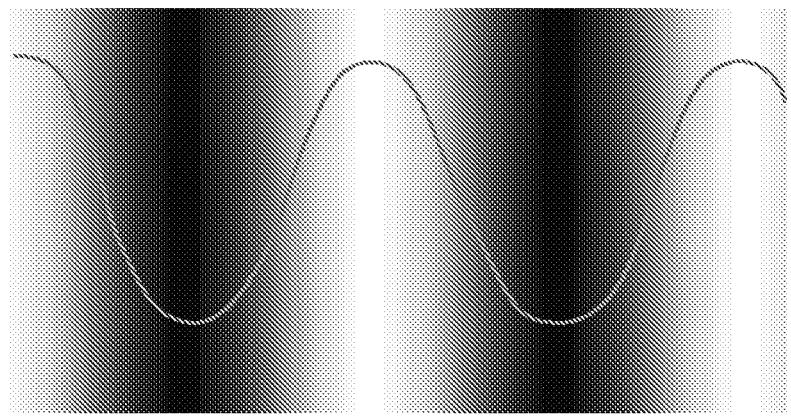
FIG. 6
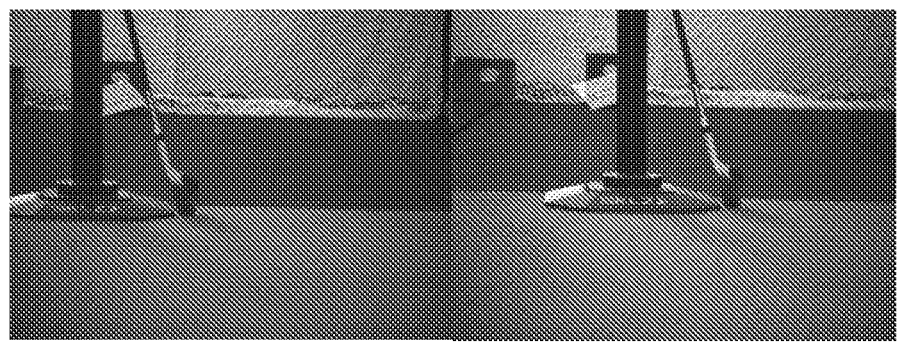
FIG. 7A   FIG. 7B

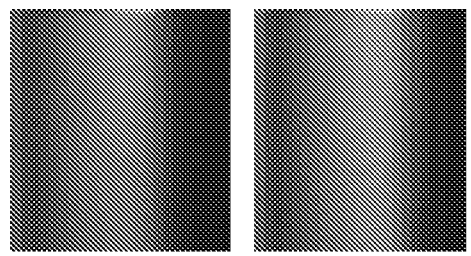
FIG. 8A  FIG. 8B
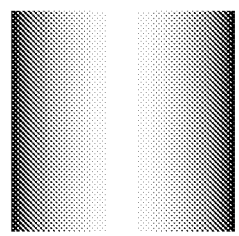
FIG. 9

MEASUREMENT AND RECONSTRUCTION OF THE GOLF LAUNCHING SCENE IN 3D

BACKGROUND

There are two main approaches for existing golf launching monitors: radar based or vision (camera) based. Compared to radar solutions, the vision solution is much cheaper and works well both indoor and outdoor; vision-based solutions can measure certain parameters, e.g. the lie angle, that the radar-based monitors cannot. They can also provide more accurate results for some key parameters, such as total spin and spin axis. Described herein is a vision-based solution for both club and ball measurement.

Vision-based methods for ball measurement are known; and there are also systems available for the measurement of both club and ball. However, existing solutions require the measuring system to be placed in a side position in relation to the player and the ball, and additional stickers need to be placed on the club face.

The side-ways placement encounters various problems: 1) different hardware setups/settings are needed for right-handed and left-handed players; 2) positioning of hardware within the view of the player may be a distraction to the player; and 3) proximity of the hardware may result in damage to the hardware caused by the swing of the club.

Placement of additional stickers on the club face makes the vision solution more robust, but entails additional cost and work for the users and affects the appearance of the club, which is not desirable for the users. Moreover, stickers placed on the club face are susceptible to wear.

To fully understand the golf launching results, high speed cameras, e.g. with 1000 fps, have been used to capture the movement of club and ball near the impact instance. This helps coaches and players to better relate the club movement and the impact on the ball, which can lead to the improvements in performance. However, this solution requires expensive hardware, and the video can be only view from one specific angle, with fixed resolution.

There are two categories of measurement in golf launch monitoring: the ball parameters and the club parameters. The present description is mainly related to the measurement of the club parameters, as the measurement of ball parameters has been covered in previous disclosures such as U.S. Pat. No. 9,171,211 B2.

The measurement of full 3D postures (position and orientation) of the club head during hitting is a challenging task for camera-based systems because of the lack of consistent distinguishing features across so many different kinds of club heads. To handle this problem, one known system (described in U.S. Pat. No. 8,951,138 B2, for example), puts the camera at the side of the player and require the player to put special stickers on the club face for detection and measurement. This approach can be troublesome to the player, and changes appearance of the club head.

BRIEF DESCRIPTION OF THE DRAWING

The present invention may be understood from the following description in conjunction with the appended drawing figures. In the drawing:

FIG. 6 is an illustration of a marker exhibiting a phase shift pattern of grayscale changes, with a sine wave superimposed thereon.

FIG. 7A is a first image of a stereo image pair of a marker on the shaft.

FIG. 7B is a second image of a stereo image pair of a marker on the shaft.

FIG. 8A is a first image of an image pair showing observed phase shift patterns for left and right images.

FIG. 8B is a second image of an image pair showing observed phase shift patterns for left and right images.

FIG. 9 is an image illustrating Lambertian reflectance of a cylindrical object in accordance with a theoretical model.

DETAILED DESCRIPTION

Summary

A vision-based, rear-placement golf launch monitoring system is provided without any requirement of additional markers, providing a more desirable solution for golfers. This system can measure the club head movement and orientation from the back of the player without any requirement of additional markers/stickers. In other embodiments, a marker may be placed on the club shaft in order to simplify hardware requirements.

With a full 3D model of the club head, a simple model of the ball and accurate measurement of their respective movements, a 3D model of the launching scene can be fully reconstructed in high fidelity. Using existing computer graphics method, this 3D model can re-generate graphics of the launching scene to be replayed at any viewing angle, with any frame rate and with any resolution. It allows the user to interact with the graphics and may use known hardware components.

By placing the measurement device behind the player (i.e., behind the golf ball), the system can be used for both left-handed and right-handed players without any discrimination. It can be located at a safe distance away from the action zone, and it will not cause any distraction to the player.

By means of 3D scanning of the club head and consequent measurement of its 3D movement, the full sequence of the club and ball movement can be accurately measured and fully reconstructed in 3D without the requirement of putting special stickers on the club face. This 3D reconstruction then allows the user to view the action from any perspective, with whatever resolution and frame rate. For example, a slow motion effect which is currently only possible with a high-end 1000FPS camera can be achieved. The 3D reconstruction also allows the user to interact with the re-play.

Scanning the club head in 3D enables the roll and bulge of the club face of woods and drivers to be compensated.

DESCRIPTION

Figure 1:
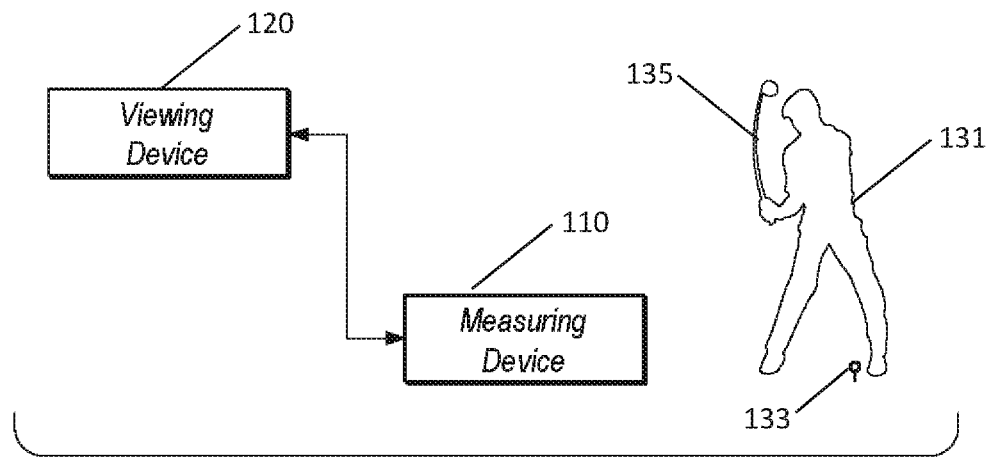
FIG. 1 is a block diagram of a golf launch monitoring system.

Referring to FIG. 1, a block diagram is shown of a golf launch monitoring system, showing the system setup. A measurement device 110 is positioned on the floor or ground behind the golfer 131 (i.e., behind the golf ball 133), who uses a golf club 135 to strike the golf ball. Processing of data can be further done through a cloud service. A viewing device 120 is provided for the user to visualize the measurement results.

Figure 2:
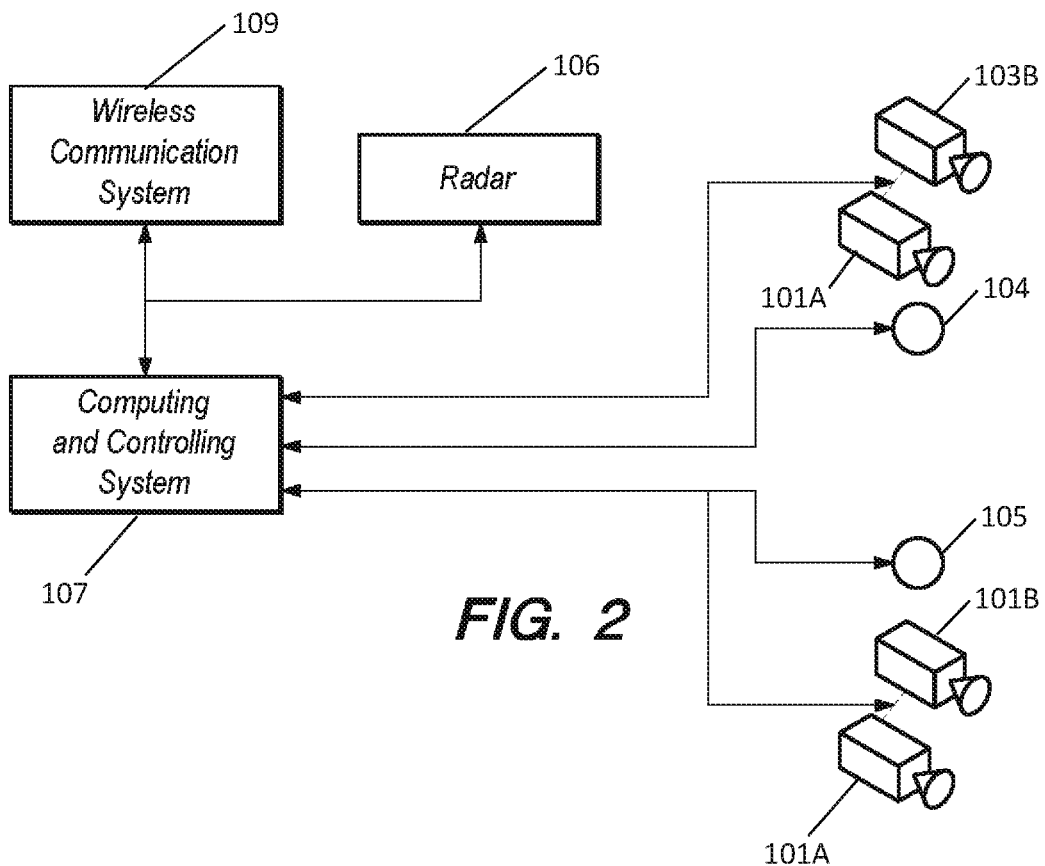
FIG. 2 is a block diagram of the measuring device of FIG. 1.

FIG. 2 illustrates a block diagram of the measuring device 110 in accordance with one embodiment. In one embodiment, the measurement device may include four cameras. Two higher-speed, lower resolution cameras 101A, 101B form a stereo system for measurement of the club and ball movement during the swing, and two slower-speed, higher-resolution cameras 103A, 103B form another stereo system for measurement of the ball trajectory. In this embodiment, the system also includes an additional lighting system 104 to ensure properly lit images, a structured lighting module 105 for 3D scanning of the club head, a radar system 106 for providing timing and sequencing of image capture by the cameras, a computing sub-system 107 that performs some real-time processing, and a wireless communication sub-system 109 to send data to the viewing device.

The measurement of the launching scene is mainly based on the first pair of cameras 101A, 101B, which is supported by a lighting system 104 and a structured lighting module 105 for 3D scanning of the club head. The second pair of cameras 103A, 103B may be used for measurement of the golf ball trajectory, details of which will not be described herein. The radar unit 106 may used to detect the starting of the player's swing to trigger the working of the cameras. Precise timing and synchronization of the cameras may be done by the computing and controlling system 107, which may be a real-time computing and controlling system, realized in FPGA form, for example. The wireless communication system 109 is used to transmit out the measurement results to the viewing device.

The present disclosure is mainly focused on the use of the first pair of cameras for measuring the club and ball movement right before and after the impact. Using a pair of synchronized cameras (e.g., cameras 101A, 101B), together with the club head 3D scanning data, the club head and ball movement may be reconstructed in 3D space with very high accuracy. The reconstruction may use stereo vision techniques.

Figure 3:
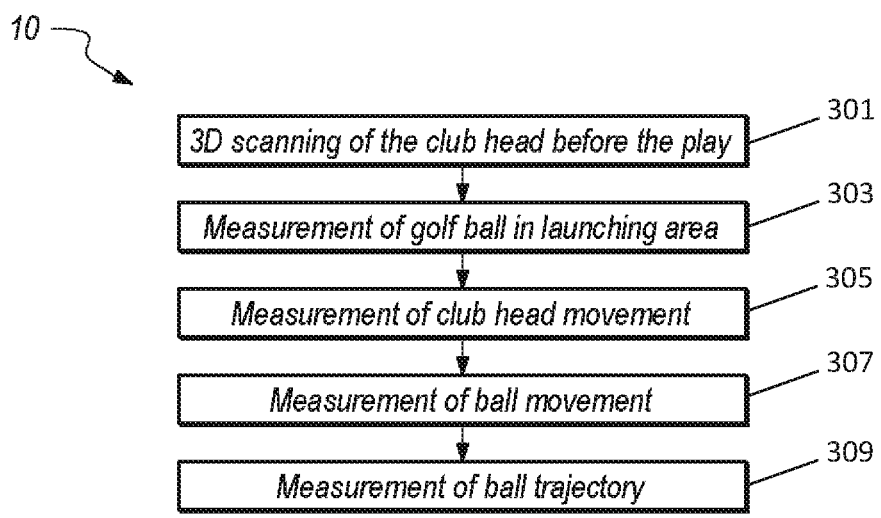
FIG. 3 is a flow diagram of a measurement procedure that may be used in the system of FIG. 1.

FIG. 3 shows the sequence 10 of the measurement during a golf play using the system, in accordance with one embodiment. The first step is before the player starts playing with a club that is not registered with the system, he/she is instructed to put the club head before the measuring device, whereupon the system works in a 3D scanning mode to scan the club head (301). Using structure lighting and two cameras, when the user turns the club head around, a series of stereo images pairs with known lighting patterns are captured. Using existing computer vision techniques, a 3D model of the club head can be re-constructed with sub-millimeter level accuracy.

Also before the play, the system will search for the golf ball in a launching area and do 3D measurement of the static golf ball (303). This information will be used for accurate modelling of the ball and accurate calculation of impact time.

Then the player is ready to play with the registered club. During each swing, the measuring device enters measurement mode and automatically captures the images and performs measurement on both the club and the ball (307, 309).

Figure 18:
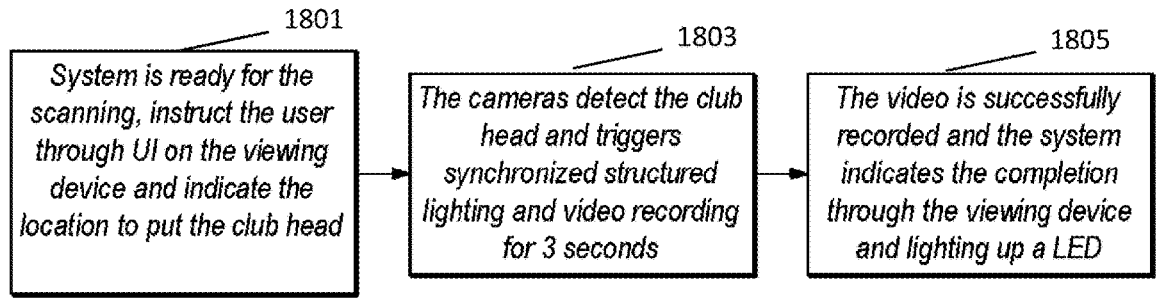
FIG. 18 is a flow diagram showing additional club scanning details.
Figure 19:
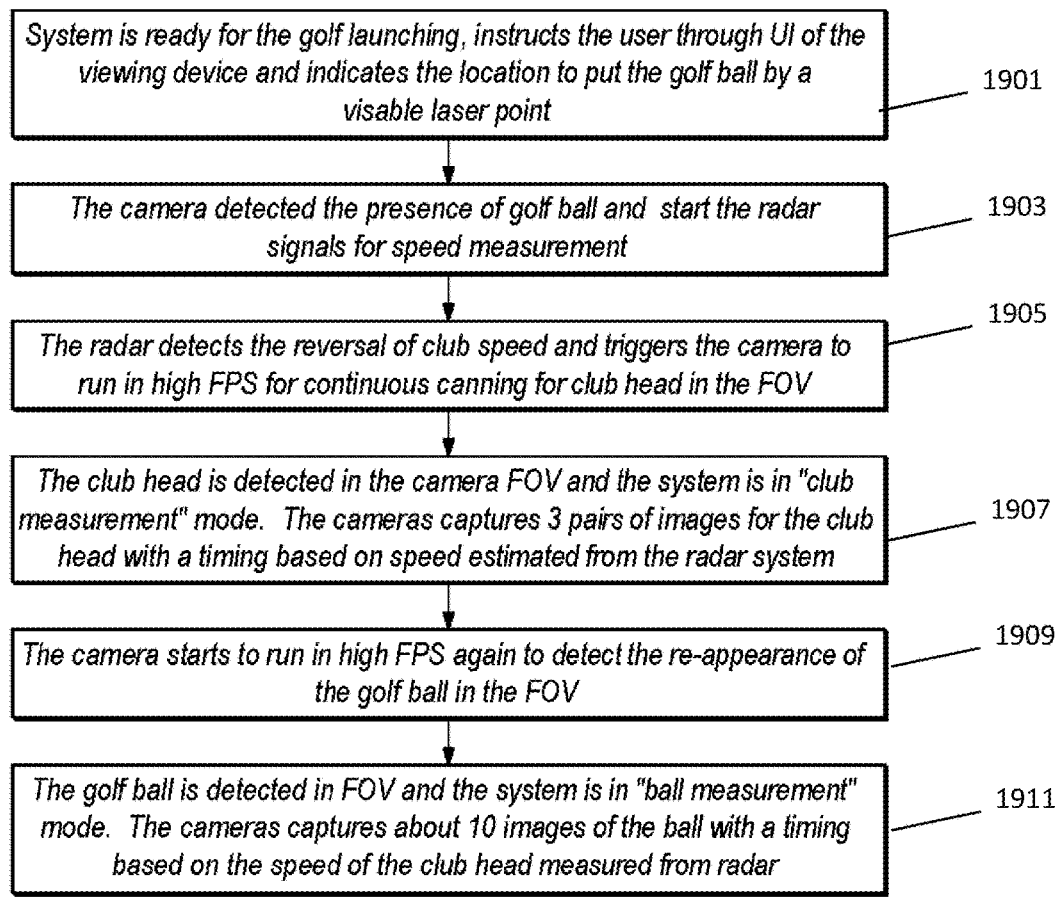
FIG. 19 is a flow diagram showing additional details of club and ball measurement.
Figure 20:
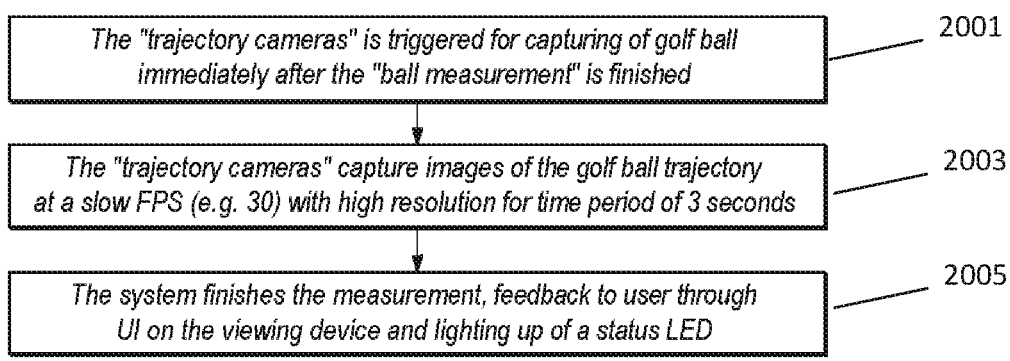
FIG. 20 is a flow diagram showing additional details of trajectory measurement.

Further details of the steps of FIG. 3 are shown in FIGS. 18, 19 and 20.

Referring to FIG. 18, when the system is ready for club head scanning, the user is instructed through a user interface (UI) on the viewing device, which indicates to the user where to position the club head for scanning (1801). The cameras 101A, 101B detect the club head, triggering synchronized structured lighting and video recording for an interval, e.g., 3 second (1803). The video is successfully recorded and the system indicates completion through the viewing device, and (optionally) by lighting up an LED.

Referring to FIG. 19, where the system is ready for golf launching, it instructs the user through UI of the viewing device and indicates a locating to put the golf ball, e.g., using a visible laser point (1901). The cameras 101A, 101B detect the presence of the golf ball and start radar operation for club speed measurement (1903). The radar detects a reversal of club head speed and triggers the cameras 101A, 101B to run in a high-FPS mode for continuous image capture to capture the club head in the field of view (FOV) (1905). When the club head is detected in the camera FOV, the system enters "club measurement" mode (1907). The cameras 101A, 101B then capture some number of image pairs of the club head with timing being based on club head speed estimated by the radar system. Thereafter, the cameras 101A, 101B start to run in high-FPS mode again to detect re-appearance of the golf ball in the FOV following impact (1909). When the golf ball has been detected in the FOV, the system enters "ball measurement" mode (1910). The cameras 101A, 101B capture some number of pairs of images (e.g., 10) of the golf ball with timing being based on club head speed estimated by the radar system.

Referring to FIG. 20, after "ball measurement is finished," a "trajectory cameras" mode is triggered (2001). The trajectory cameras 103A, 103B capture images of the golf ball trajectory in a low-FPS (e.g., 30 FPS) mode with high resolution for a timer period (e.g., three seconds) (2003). The system finishes the measurement and provides feedback to the user through UI and the viewing device and (optionally) by lighting up of a status LED (2005).

For the measurement of the ball movement, further details of suitable methods are described in previous patents of the present assignee, including U.S. Pat. No. 9,171,211 B2, incorporated herein by reference. The measurement of the ball trajectory may likewise incorporate known techniques. The present description mainly focuses on methods for measurement of the club movement.

The measurement of the attack angle, club path and speed may be performed by measuring the 3D position of the center of gravity (COG) of the club head, which is very near to the center of the pixels of the club head in the image domain. The speed measurement accuracy can be further improved with the measurement from the radar. The 3D position for each pair of images at every time sample may be determined by measuring the difference between the center of the club head pixels. Traditional stereo vision method can be applied to deliver sub-millimeter accuracy.

As the system is observing the club head from the back, the 3D orientation of the club face needs to be determined by a 3D registration procedure. With the 3D data of the club head from the previous 3D-scanning process, the club face position and orientation at each and every frame can be accurately determined with a 3D registration process.

Figure 4:
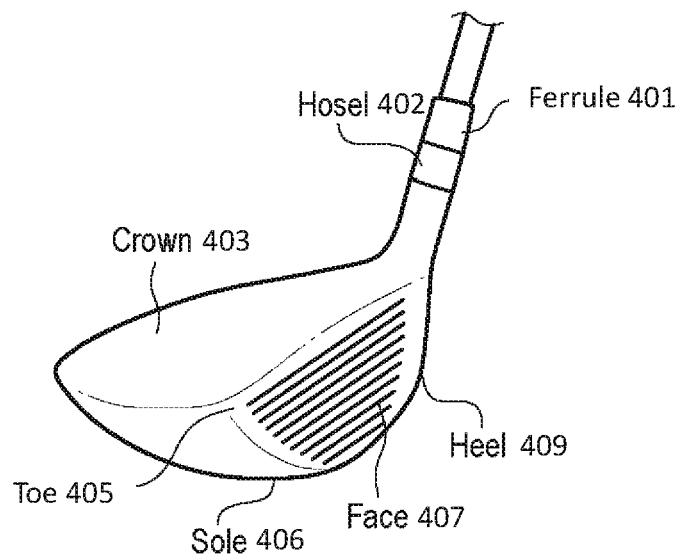
FIG. 4 is a diagram of a known club head, identifying parts thereof.
Figure 5:
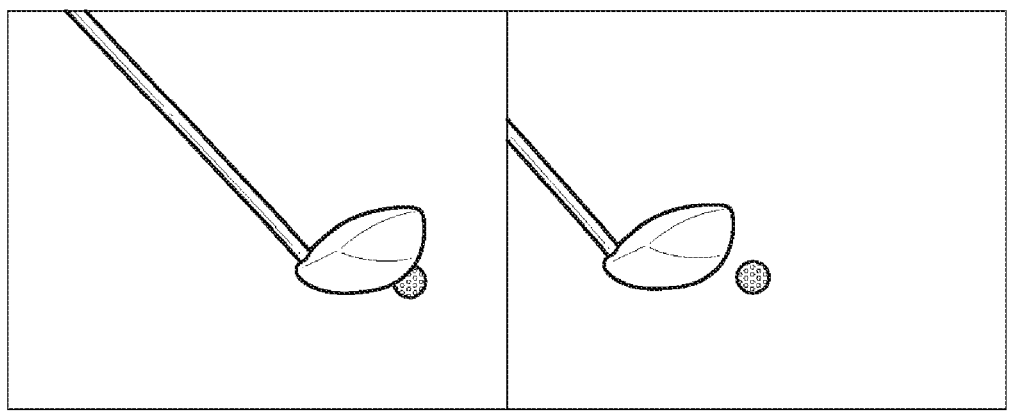
FIG. 5 is a stereo image pair (background removed) showing a driver and ball before impact.

FIG. 4 illustrates parts of a known club head, including ferrule 401, hosel 402, crown 403, toe 405, sole 406, face 407 and heel 409. There are multiple approaches for the 3D registration process, two examples of which will be described. The first approach is based on two sources of data: 1) measurement of a 3D line segment between Hosel and Ferrule on the club shaft, which does not bend during the swing, using stereo vision techniques; and 2) the location of features, such as the silhouettes, observed by the two cameras. Both of these can be measured accurately using the images captured by stereo system as shown in FIG. 5. With a 3D model of the club head generated from the 3D scanning, software techniques are used to find a 3D orientation (together with the 3D position) of the 3D model that best matches with the two observations at any time instance. The RMS error of this estimation method is less than one degree in 3D space. With this registration done, the lie angle is also determined with accuracy of less than one degree.

The second approach requires a marker to be attached to the club shaft, near the tip region. Compared to the existing system which requires multiple stickers to be put on different locations on the club face, the marker design and placement is much easier, causes less appearance issues with the club and will not wear out as it does not contact the ball at all. At the same time, the use of a special designed marker enables a single camera solution. FIG. 6 is an illustration of a marker exhibiting a phase shift pattern of grayscale changes, with a sine wave superimposed thereon. A design pattern of the marker helps to determine the rotation angle around the shaft axis very accurately. The pattern (named "phase shift") may be used to enable image processing to measure the rotation angle with 0.5 degrees accuracy when observed at a distance of about 2 meters. With the shaft 3D position accurately measured with the stereo camera system, together accurate measurement of the rotation angle using this pattern, the face orientation may be determined with 1 degree accuracy using the 3D registration process.

FIG. 7A and FIG. 7B show a stereo image pair with the marker attached to a club. The marker region can be first detected and rectified using image processing techniques such as edge detection, feature detection, rotation estimation and perspective correction, which give rise to the rectified observations of the marker as shown in FIG. 8A and FIG. 8B. These observations may be further processed to remove the reflectance variation caused by the cylindrical shape of the shaft, as illustrated by the theoretic model shown in FIG. 9.

Figure 10:
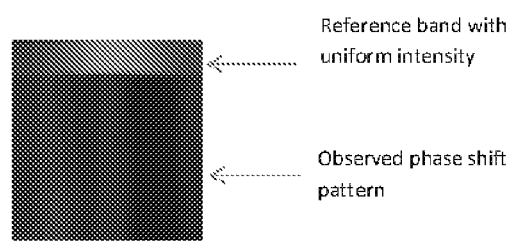
FIG. 10 is an image of a marker provided with a reference band to enable reflectance variation removal.

In practice, the reflectance variation can be measured with a reference band of uniform intensity value as shown in FIG. 10. The upper part 1001 of the image is the uniform white color band used as reference. The observed variance in the grayscale value in this band can be used to correct the reflectance variation in the observed phase shift pattern 1003. This reference-based method can be more accurate than using the theoretical model, as the latter does not include factors such as wavelength of the light source, the reflectance coefficient of the marker, the camera response function etc., which are all included in the direct measurement.

With the reflectance variation compensated, the observed markers may be correlated with the designed phase pattern using a FFT (Fast Fourier Transformation) registration method, which can give the accuracy of one tenth of a pixel; in contrast, conventional edge detection can only give up to half a pixel accuracy in such lighting conditions. This shift in pixels is finally converted to the rotation angle around the center axis of the shaft with known marker size and optics of the imaging system. The correspondence between this angle value and the club face orientation is established in the 3D scanning phase, thus in the measurement phase, this rotational angle, together with the 3D position & orientation of the shaft, can be directly translated into the 3D face angle, with the known 3D model of the club.

Figures 11A, 11B:
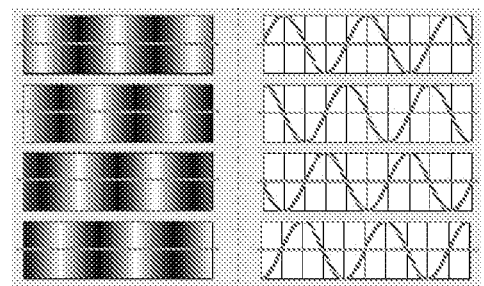
FIG. 11A is an image of one suitable phase shift pattern.
FIG. 11B is a diagram of an intensity profile corresponding to the phase shift pattern of FIG. 11A.

To increase the robustness of the system, instead of using a 1D phase-shift pattern, a few phase shift patterns with different phases can be stacked in a pre-defined sequence to form a 2D pattern, as shown for example in FIG. 11. This arrangement will increase the robustness of the system as there is more information coded in the pattern; it also has the potential of increasing the measurement accuracy by averaging among the multiple readings (for example, four in the illustrated case).

Figure 12:
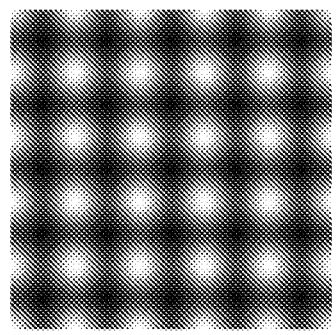
FIG. 12 is an image of phase shift pattern modulated in two dimensions.

Alternatively, a phase shift pattern may be used that is modulated in two dimensions as illustrated in the FIG. 12. By use the phase shift method in two dimensions, it is possible to detect a reference point, for example the center of the brightest spot, with very high accuracy in both directions. With the original dimensions of the patterns and the optics of the imaging system known, it is then possible to estimate both the distance (via changes in the spaces between grids of such feature points) and 3D orientation (via the distortion pattern formed by the grids) of the shaft, in addition to the rotation angle around the shaft (via phase shift in one dimension). This capability removes the need for a stereo camera system and enables a single camera solution for club measurement. This approach can also be applied to other sports such as baseball, where the bat's orientation and distance measurement are critical.

Figure 13:
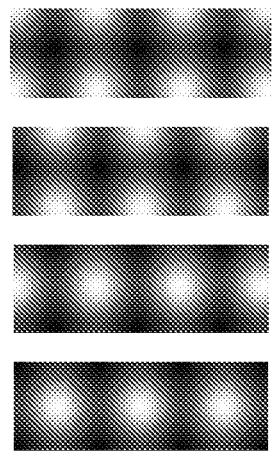
FIG. 13 is an image of a stacked 2D modulated phase pattern for better robustness and accuracy.

This 3D grid pattern can be arranged/stacked in various ways to improve robustness and accuracy as illustrated in the FIG. 13.

As the golf ball is blocked by the club head when viewed from the system, the time of impact (the maximum compression time) can only be estimated from the ball movement. The ball is not moving before the impact instance and its 3D position can be measured using the stereo vision method very accurately. With the ball's 3D position measured when it is first seen and the balls speed measured using following frames, the time of impact can be estimated with an accuracy of 0.1 ms level based on the fact that the ball moves at a constant speed after the impact. This timing information is important for at least two reasons: 1) the club parameters need to be reported exactly at this time point; 2) the impact position on the club face can be estimated accurately for purposes of face angle compensation.

Figure 14:
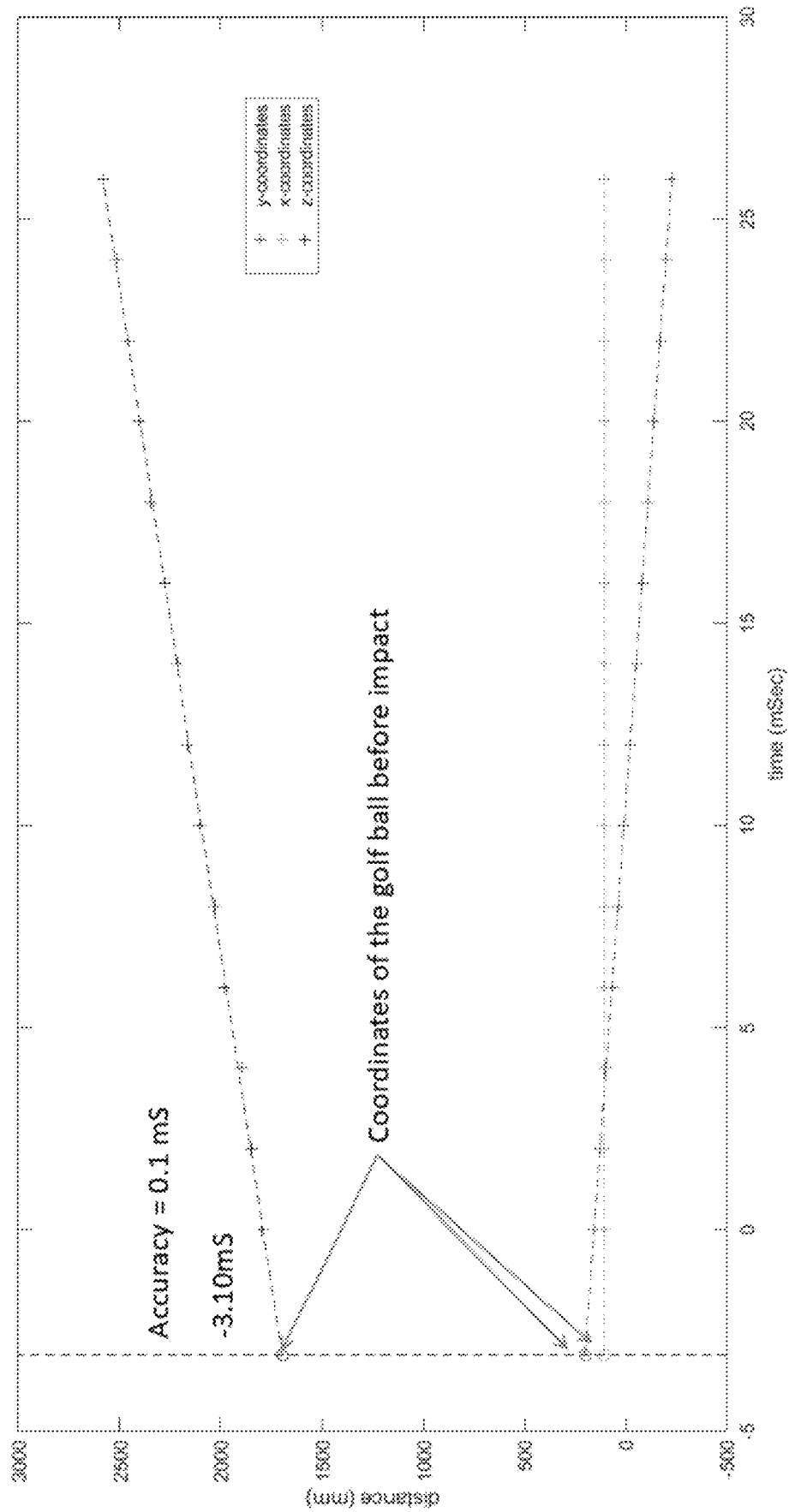
FIG. 14 is a diagram illustrating estimation of impact from the golf ball movement.

FIG. 14 illustrates the estimation of impact instance based on the measurement of initial position and moving trajectory of the golf ball (after the occlusion by the club head), for a real case. In this figure, time 0 is the capturing time of the first frame in which the golfball is moving out of the occlusion of the club head. Based on ball speed, the impact time is determined to have been −3.10 ms.

With this impact time estimated accurately, the related 3D position of the club head and ball at this instance can be calculated accurately. Using the 3D model, the face angle and impact position can be reported accurately. Unlike existing systems, this face angle already compensates the club face angle variation of wood and drivers.

Figure 15:
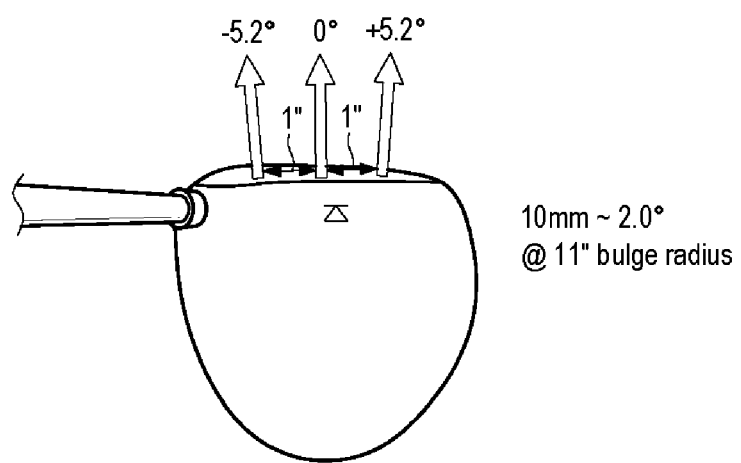
FIG. 15 is a diagram showing face angle variation on woods depending on club face location. Variation can occur both horizontally and vertically for both woods and drivers.

The club face angle variation along the surface for wood and drivers, also known as the bulge and roll factor, is illustrated in FIG. 15. The face angle orientation is dependent on the location of the club face. In the case of an 11 inch bulge radius, in the illustrated example, a distance of 1 0mm across the club face corresponds to a difference of two degrees of a line perpendicular to the club face. In existing systems, this variation commonly leads to a error of the reported face angle, as this information is not available and a flat surface is assumed. However, with the 3D model available in the present system and the impact position accurately measured, this error is automatically removed.

With the methods described, all the club related data can be measured as shown in Table 1. Together with the 3D model of the club head, the simple model of the golf ball and ball parameters (measured, for example, using methods similar to those described in U.S. Pat. No. 9,171,211 B2), the 3D scene of the golf ball launch can be fully reconstructed with high accuracy. As there are different types of golf balls, some parameters, such as the exact diameter, may be obtained from the ball measurement result.

TABLE 1

The club parameters definition and measurement method

| Club Paramters to be Measured | Definition | Measurment Method |
|---|---|---|
| Club Head Speed | The speed the club head is traveling immediately prior to impact. | Stereo Vision on Club Head (COG) + Radar |
| Attack Angle | The vertical direction of the club head's geometric center movement at maximum compression of the golf ball | Stereo Vision on Club Head (COG) |
| Club Path | Club Path is the direction the club head is moving (right or left) at impact. | Stereo Vision on Club Head (COG) |
| Impact Position on Club Face | The contact position of the ball on the club face at impact | Sweep path + impact instance estimation + 3D registration |
| Club Face Angle | The direction the club face is pointed at impact (left or right) | Impact position + 3D model |
| Dynamic Lie at Impact | The angle between the center of the shaft and the sole of the club | Stereo vision + 3D registration |

This 3D reconstruction can be realized with 3D tools like OpenGL, with input of the 3D model of the club head, the ball and the measured parameters about the movement of the head and the ball. The purpose is to allow the player examine the movement of the club and ball in theoretically infinite fine details in both space and time to understand the relationship between the final delivery performance and the control on the club. In this way, the player can improve his/her performance more effectively.

Figure 16:
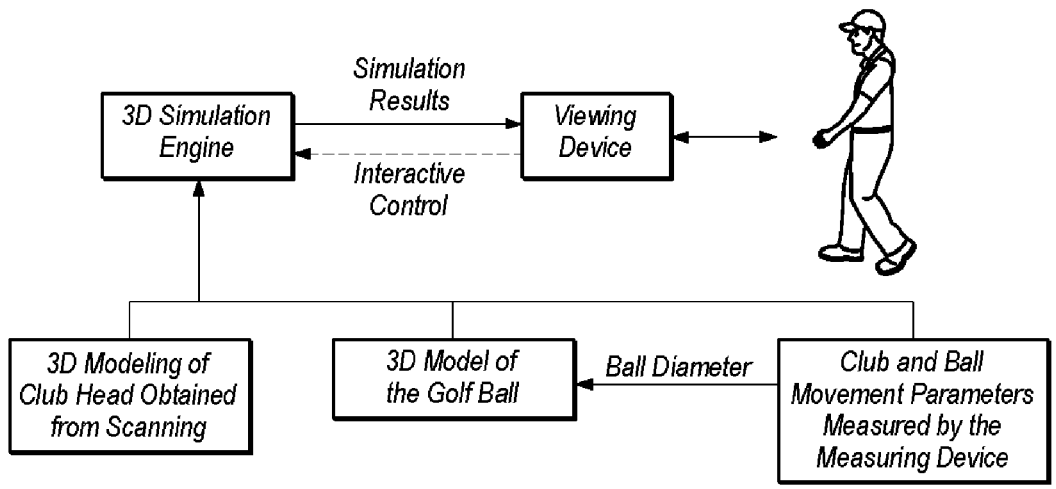
FIG. 16 is a block diagram illustrating 3D reconstruction of the full launching scene.

FIG. 16 is a block diagram illustrating 3D reconstruction of the full launching scene in accordance with an exemplary embodiment. A 3D model 1601 of the club head obtained from scanning, a 3D model 1603 of the golf ball, and club and ball movement parameters 1605 measured by the measuring device are input to a 3D simulation engine 1607. The 3D model of the golf ball may be based on a ball diameter measured by the measuring device 110. The 3D simulation engine produces simulation results 1609, which may be viewed by the user on the viewing device 120. The UI of the viewing device provides for interactivity, whereby interactive control inputs 1611 are provided to the 3D simulation engine 1607. New simulation results are then produced and displayed accordingly.

Figure 17:
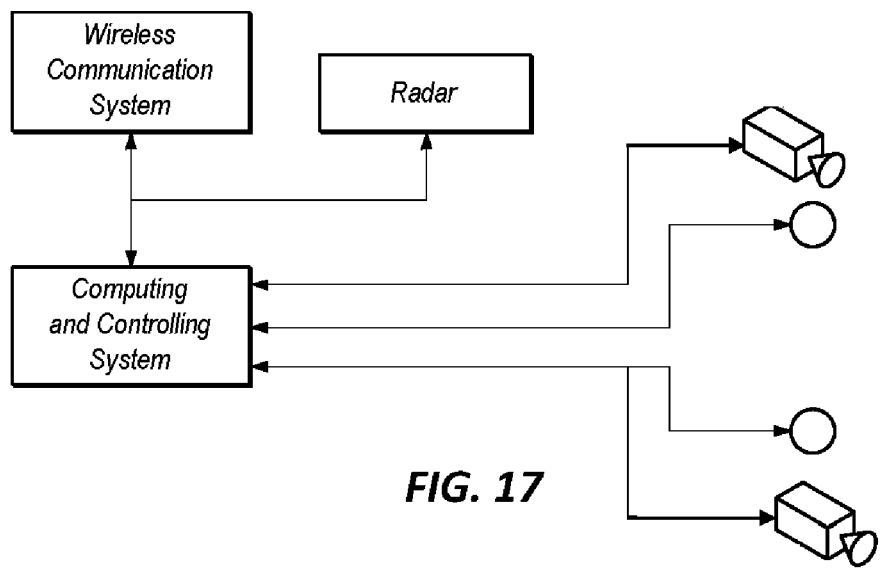
FIG. 17 is a block diagram of another embodiment of the measuring device of FIG. 1.

Using a sticker and image processing as described above, the requirements of stereo camera systems may be removed. This change simplifies the system and reduces the cost. The 3D information provided by the stereo system is lost. However, 3D measurement can still be done. First, 3D scanning can be realized with a single camera and the structured lighting of a 2D pattern with the club head rotating a full revolution before the camera. In addition, the first camera observing the club movement can deduce the distance and 3D orientation of the shaft and the orientation around the shaft based on the observed 2D phase shift marker. For the second camera observing the golf ball, again the distance information can be estimated from the observed golf ball size, which has an inverse relationship with the distance from the camera. A much simpler hardware design results, as shown in FIG. 17. As compared to the system of FIG. 2, the camera pairs 101A, 101B and 103A, 103B are replaced by single cameras 1701 and 1703. In still other embodiments, the functions of the cameras 1701 and 1703 may be performed by a single multi-function camera.

It will be appreciated by those skilled in the art that the present invention may be embodied in other specific forms without departing from the spirit or essential character thereof The disclosed embodiments are therefore intended in all respects to be illustrative and not restrictive. The scope of the invention is indicated by the appended claims rather than the foregoing description, and all changes that come within the scope and range of equivalents thereof are intended to be embraced therein.

What is claimed is:

1. A method comprising:
    performing scanning of a golf club to obtain scanning information;
    using at least one camera positioned behind the golf ball and at least one lighting unit to obtain a series of images of the golf club and golf ball during swinging of the golf club;
    using a control unit and a radar unit to control the at least one camera and at least one lighting unit; and
    providing the scanning information and the images to a modeling unit, the modeling unit to generate a model of the golf club based on the scanning information and the images.

2. The method of claim 1, wherein the golf club has at most one sticker attached thereto, the sticker bearing at least one modulated brightness pattern, the at least one modulated brightness pattern being visible or invisible to human eyes.

3. The method of claim 2, wherein the at least one brightness pattern is modulated in two dimensions.

4. The method of claim 2, wherein the sticker bears multiple separate modulated brightness patterns.

5. The method of claim 2, wherein the sticker is placed on a shaft of the golf club.

6. The method of claim 1, comprising using the modeling unit to obtain a model of a golf club swing and impact with the golf ball.

7. The method of claim 6, wherein the model accurately models a 3D shape of a face of the golf club.

8. The method of claim 1, comprising displaying an interactive video representing a golf club swing, and impact with the golf ball.

9. The method of claim 1, comprising using a first plurality of cameras positioned behind the golfer to obtain the series of images of the golf club during swinging of the golf club.

10. The method of claim 1, wherein the scanning information is 3D scanning information, comprising using a second plurality of cameras positioned behind the golfer and at least one further lighting unit to perform 3D scanning of the golf club to obtain the 3D scanning information.

11. A comprising:
at least one camera positioned behind the golf ball and at least one lighting unit, the at least one camera being configured to:
perform scanning of a golf club to obtain scanning information; and
obtain a series of images of the golf club and golf ball during swinging of the golf club;
a control unit and a radar unit coupled to the at least one camera and the at least one lighting unit to control the at least one camera and at least one lighting unit; and
a modeling unit connected to receive the scanning information and the images, the modeling unit to generate a model of the golf club based on the scanning information and the images.

12. The system of claim 11, wherein the golf club has at most one sticker attached thereto, the sticker bearing at least one modulated brightness pattern.

13. The system of claim 12, wherein the at least one brightness pattern is modulated in two dimensions.

14. The system of claim 12, wherein the sticker bears multiple separate modulated brightness patterns.

15. The system of claim 12, wherein the sticker is placed on a shaft of the golf club.

16. The system of claim 11, wherein the modeling unit is configured to obtain a model of a golf club swing and impact with the golf ball.

17. The system of claim 16, wherein the model accurately models a 3D shape of a face of the golf club.

18. The system of claim 11, comprising a display coupled to the control unit for displaying an interactive video representing a golf club swing and impact with golf ball.

19. The system of claim 11, comprising a first plurality of cameras positioned behind the golfer to obtain the series of images of the golf club during swinging of the golf club.

20. The method of claim 1, wherein the scanning information is 3D scanning information, comprising a second plurality of cameras positioned behind the golfer to perform 3D scanning of the golf club to obtain the 3D scanning information.

21. A method comprising:
using at least one camera positioned behind the golf ball to perform scanning of a golf club to obtain scanning information;
using at least one other camera positioned behind the golf ball and at least one lighting unit to obtain a series of images of the golf club and golf ball during swinging of the golf club;
using a control unit to control both the at least one camera and the at least one other camera and the at least one lighting unit; and
providing the scanning information and the images to a modeling unit, the modeling unit to generate a model of the golf club based on the scanning information and the images.

22. The method of claim 21, wherein the golf club has at most one sticker attached thereto, the sticker bearing at least one modulated brightness pattern.

23. The method of claim 22, wherein the at least one brightness pattern is modulated in two dimensions.

24. The method of claim 22, wherein the sticker bears multiple separate modulated brightness patterns.

25. The method of claim 22, wherein the sticker is placed on a shaft of the golf club.

26. The method of claim 21, comprising:
using the control unit and a radar unit to control the at least one camera and the at least one other camera.

27. The method of claim 21, comprising using the modeling unit to obtain a model of a golf club swing and impact with the golf ball.

28. The method of claim 21, wherein the model accurately models a 3D shape of a face of the golf club.

29. The method of claim 21, comprising displaying an interactive video representing a golf club swing and impact with the golf ball.

30. A method comprising:
capturing images of a sticker that is attached to a piece of sports equipment using a single camera during dynamic movement of the piece of sports equipment by a user, the sticker bearing at least one modulated brightness pattern, modulated in two dimensions; and
processing the images to model dynamic movement of the piece of sports equipment based on the images.

* * * * *